United States Patent [19]
Do et al.

[11] Patent Number: 5,890,693
[45] Date of Patent: Apr. 6, 1999

[54] PERSONAL COMPUTER ENCLOSURE WITH PERIPHERAL DEVICE MOUNTING SYSTEM

[75] Inventors: Cuong D. Do, Woodland Hills; Joseph A. Butryn, Los Angeles, both of Calif.

[73] Assignee: Citicorp Development Center, Inc., Los Angeles, Calif.

[21] Appl. No.: 907,853

[22] Filed: Aug. 8, 1997

Related U.S. Application Data

[62] Division of Ser. No. 642,451, May 3, 1996, Pat. No. 5,701,231.

[51] Int. Cl.[6] .................................................. A47B 91/00
[52] U.S. Cl. ...................... 248/346.03; 248/500; 248/680
[58] Field of Search ........................ 248/346.03, 346.04, 248/500, 316.7, 229.16, 229.26, 680, 681

[56] References Cited

U.S. PATENT DOCUMENTS

| | | | |
|---|---|---|---|
| 474,082 | 5/1892 | Dewey | 248/346.04 X |
| 1,172,382 | 2/1916 | Merritt, Jr. | 248/346.04 X |
| 2,819,858 | 1/1958 | Mittendorf | 248/500 X |
| 5,051,868 | 9/1991 | Leverault et al. | 361/365 |
| 5,460,441 | 10/1995 | Hastings et al. | 312/298 |
| 5,495,389 | 2/1996 | Dewitt et al. | 361/683 |

FOREIGN PATENT DOCUMENTS

| | | | |
|---|---|---|---|
| 0647897A | 10/1994 | European Pat. Off. | G06F 1/18 |
| 29508214U1 | 8/1995 | Germany | G06F 1/16 |
| 3142516 | 6/1991 | Japan | G06F 1/18 |

*Primary Examiner*—Ramon O. Ramirez
*Attorney, Agent, or Firm*—Blakely Sokoloff Taylor & Zafman

[57] ABSTRACT

A method and apparatus to provide easy installation and removal of peripheral devices in a computer is disclosed. A bracket for engaging a peripheral device is installed in a manner that a bottom portion couples to a computer housing; a side portion extends at an acute angle; and an engaging flange is positioned at the end of the side portion.

5 Claims, 4 Drawing Sheets

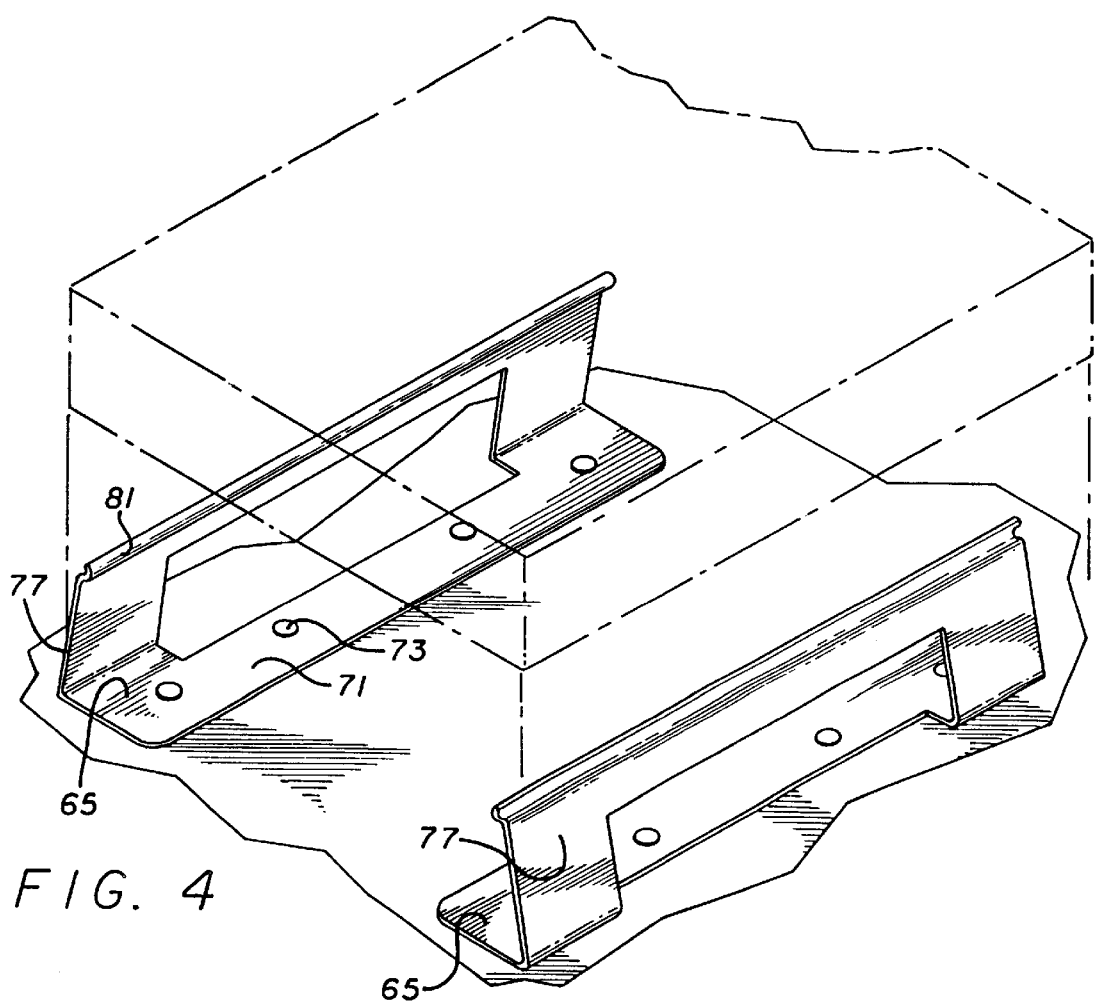
FIG. 4
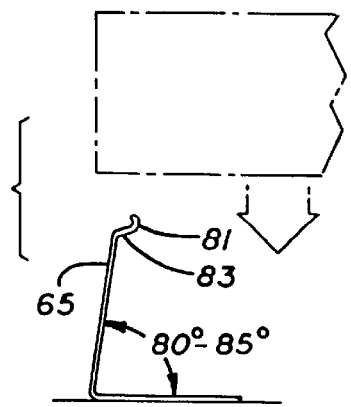
FIG. 6
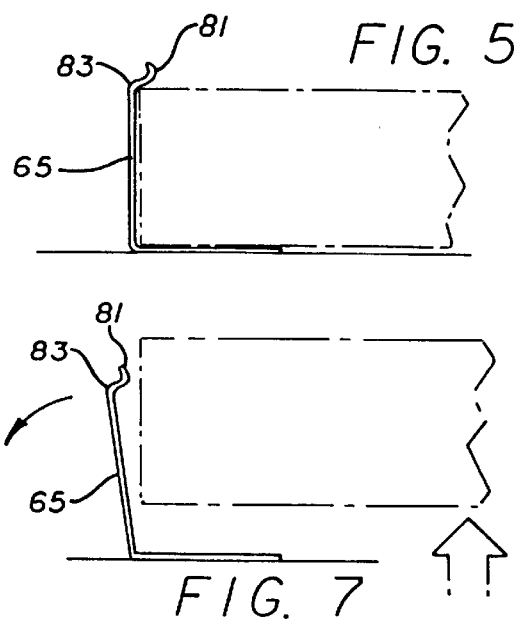
FIG. 5
FIG. 7

PERSONAL COMPUTER ENCLOSURE WITH PERIPHERAL DEVICE MOUNTING SYSTEM

This is a divisional of application Ser. No. 08/642,451, filed May 3, 1996, now U.S. Pat. No. 5,701,231.

BACKGROUND OF THE INVENTION

The invention is directed to the field of personal computer enclosures, particularly to enclosures which are compact and include efficient cooling mechanisms and a design which enables components within the enclosure to be easily serviced, installed, removed and reinstalled.

For example, Henneberg et al., U.S. Pat. No. 4,748,540, is directed to a computer system including cards, power supplies, peripheral units, cooling units and cables which are packaged within a small enclosure in a way which permits sufficient airflow from front to rear of the enclosure for ventilation. The enclosure includes a hinged lift-off top cover, front and rear attachable panels and attachable side panels, the panels being attachable to the frame of the enclosure by screws or pins. To service the equipment, one or more of the attachable panels must be removed.

In Hileman et al., U.S. Pat. No. 5,287,244, a computer housing is described having a cover and a base with both a left surface and right surface of the cover perforated with vents to allow the passage of air through the housing. The cover is pivotally attached to the base so that it can be pivotally separated from the base. All of the units forming the computer system are installed on the base.

Due to the heat generated by components forming a computer system during operation, small enclosed cabinets used for such components generally require the incorporation of fans to ensure a proper flow of air. Representative prior art patents include Tragen, U.S. Pat. No. 4,739,445, Cope et al., U.S. Pat. No. 5,121,291 and Bailey—U.S. Pat. No. 5,107,398. In Tragen, one or more fans are mounted on a plate rack forming a fan drawer which is guided by a pair of spaced guide rails which guide the fan drawer into position so the fans can be quickly and easily removed for service or replacement without having to remove the electronic components from the protected cabinet. In Cope et al., a cooling system for a personal computer includes an intake fan and exhaust openings, one of which includes an exhaust fan which diverts some of the air-flow to increase the flow of air over the power supply. The fans are activated as needed to meet increased demand for cooling. In Bailey, an air circulation device is provided which is mounted inside the cabinet of a computer.

The invention also includes a mechanism which enables the quick and easy installation and removal of peripheral devices from an enclosure in which they are installed. The prior art typically does not provide a quick and easy mechanism for removing peripheral devices. Typically, in the prior art, attachment hardware is needed for a mechanism used to hold peripheral devices in place using mounting holes and bolts which pass through the mounting holes into a bracket in which the peripheral device had been previously installed.

BRIEF SUMMARY OF THE INVENTION

The invention is directed to an enclosure or chassis for a high-performance personal computer which is portable, provides easy access to its internal components for servicing, and provides mechanisms which allow peripheral devices such as hard disks, floppy disks and CD-ROM drives to be quickly and easily installed and removed.

The chassis is also designed to provide an efficient cooling mechanism so that a heat sink required for a high-performance processor can be smaller than would be the case without such efficient cooling mechanism. In this manner, an overall more compact design can be realized.

The chassis opens up into a top portion and a bottom portion. The top portion houses the peripheral devices, and the bottom portion houses the motherboard, power supply and cooling fans. A tamper switch is provided which monitors the state of the chassis (open or closed) and reports over a network whenever the chassis is opened. However, the computer can still be operated when the chassis is opened for inspection, service and repair.

The mechanism which enables quick and easy removal of the peripheral devices utilizes a spring clip which provides solid grounding contact to the chassis.

BRIEF DESCRIPTION OF THE DRAWINGS

FIG. 4 is a perspective view of a pair of peripheral device mounting brackets according to the present invention with a peripheral device shown in shadow lines.

FIG. 5 is side elevation view of one of the brackets shown in FIG. 4 an installed peripheral device.

FIG. 6 is a side elevation view of one of the brackets shown in FIG. 4 prior to installing a peripheral device.

FIG. 7 is a side elevation view of one of the brackets shown in FIG. 4 while installing (or removing) a peripheral device.

DETAILED DESCRIPTION OF THE INVENTION

Figure 1:
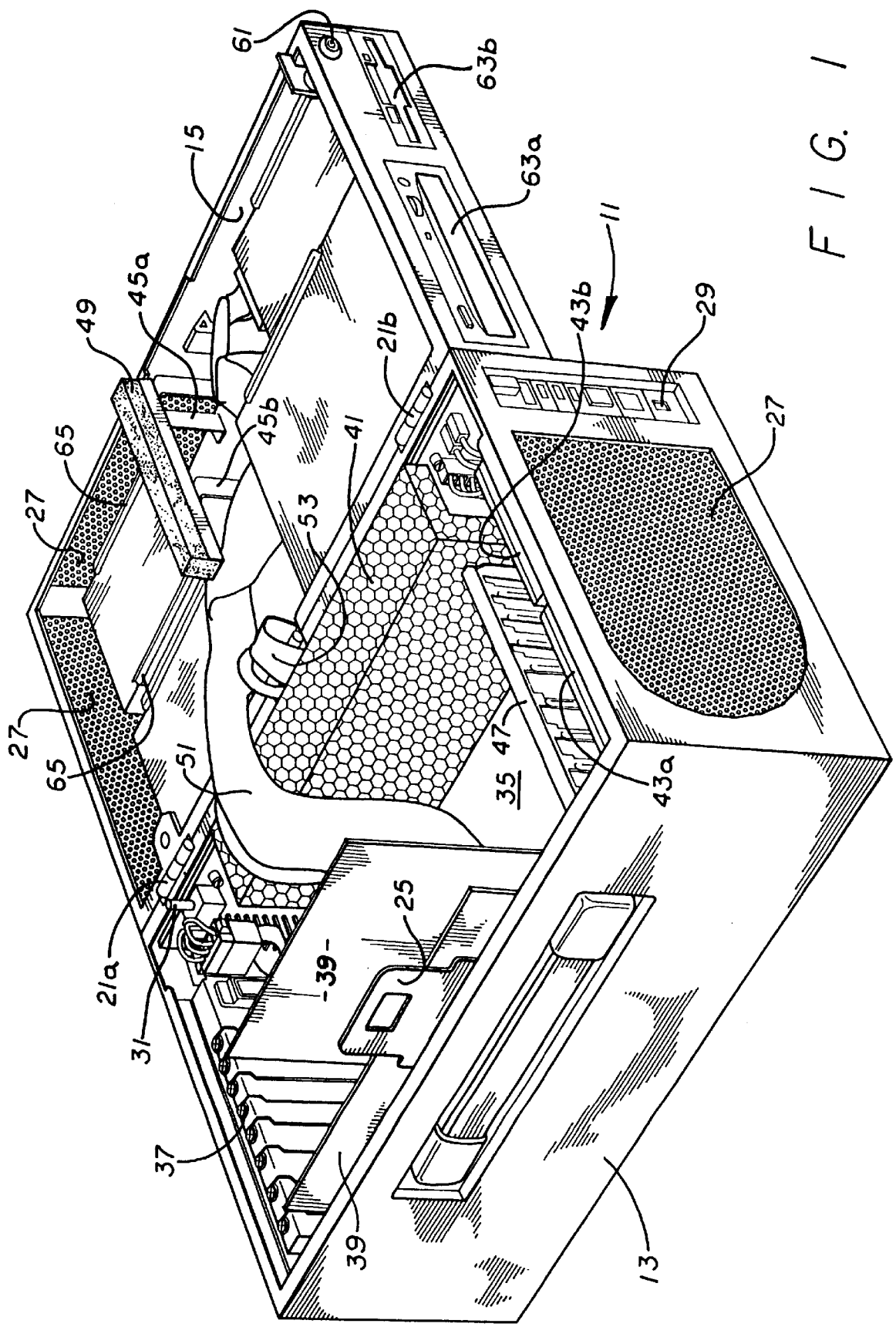
FIG. 1 s a perspective view of the invented chassis in an open position showing typical components of a personal computer installed in t chassis.

Referring now to FIG. 1, a chassis used for installing components of a personal computer according to the present invention is shown. The chassis 11 includes two main components, a bottom portion 13 into which a motherboard, power supply, card cage and cooling fans of a personal computer are installed and a top portion 15 is used to hold peripheral devices such as floppy disk drives, hard disk drives and CD-ROM drives. The chassis also includes hinges 21a and 21b which connect the two portions together and serve as a pivot to enable the top portion to close down upon the bottom portion so as to engage latch 25.

The chassis also includes a switch 31 which generates an active signal when the chassis is open, i.e., when the top portion is not closed down upon the bottom portion so that the switch, which pops-up when pressure from the top portion is removed, changes state from open to closed or from closed to open depending on the system design. Although the switch is shown near the rear of the chassis, it may be located at any point along the edge of the chassis.

Figure 3:
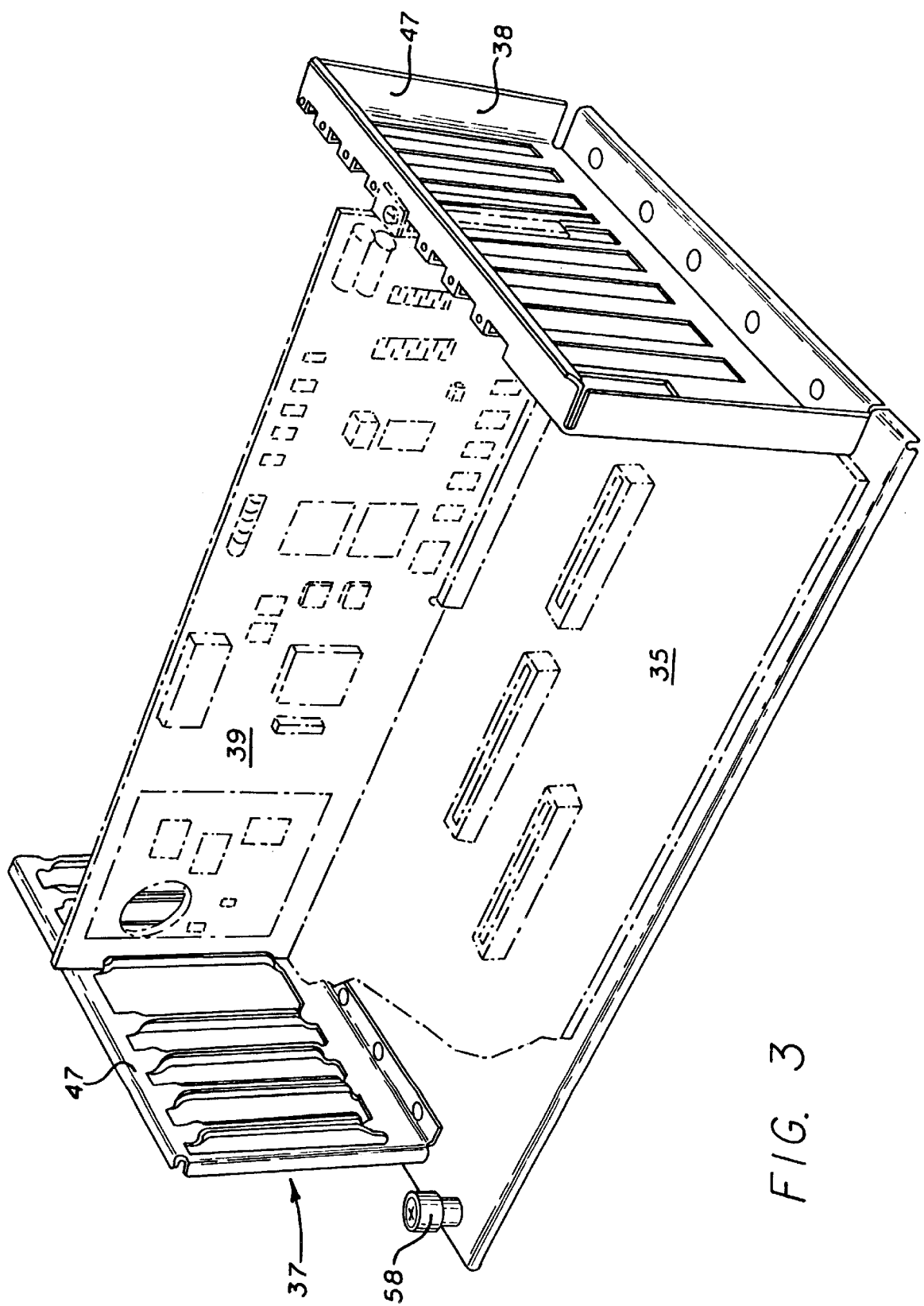
FIG. 3 is a perspective view of a motherboard and card cage sub-chassis according to the present invention.

Typical components installed in the bottom portion of chassis 11 are motherboard 35, card cage rear slots 38 (part of card cage 37 as shown in FIG. 3) for holding in place peripheral cards 39 installed in slots on the motherboard, a power supply 41, fans 43a and 43b, and fan guard and front card cage slots 47 which are part of card cage 37. The chassis also includes vents 27 and control switches and lights 29 for turning power on and off, resetting the computer and providing status information. Vents 27 are also provided on the rear and side portions of the top half 15 of the chassis. The chassis has a form factor which is very compact with dimensions just slightly larger than needed to hold typical standard sized components. For example, typically the height of bottom half 13 is five inches, the width is 10 inches and the length is 17 inches. Typical dimensions for the top half 15 are two inch height, 10 inch width and 17 inch length. With these dimensions, the chassis can hold a standard sized motherboard 35 whose dimensions are approximately 13 inches by 8 inches, standard sized peripheral boards 19, whose dimensions are 4 inches high with a length upto 13¼ inches, and standard sized peripheral devices such as hard disk drives and CD-ROM drives having a height of 1.5 inches or less, in a minimal amount of space which still provides easy access for servicing.

Figure 2:
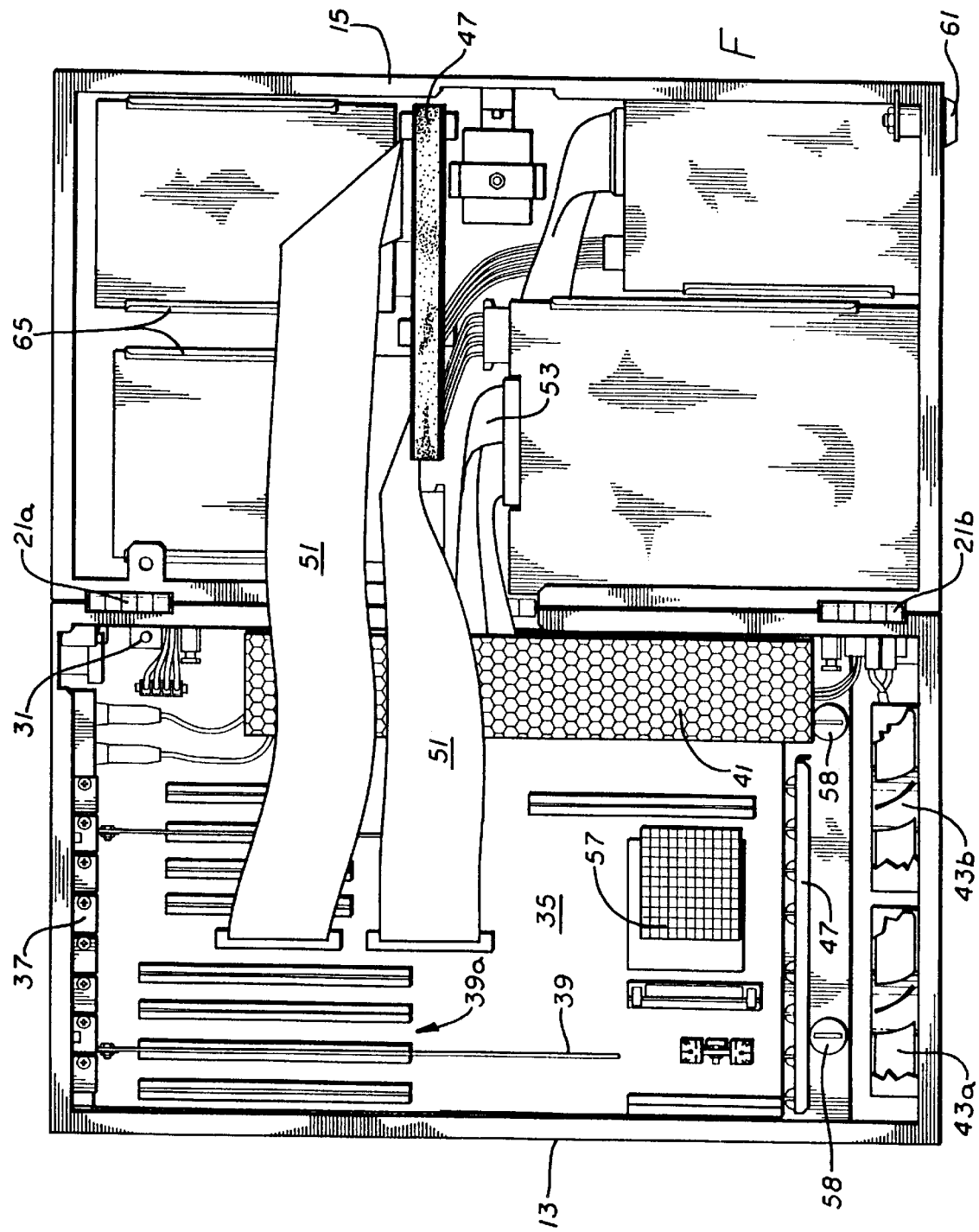
FIG. 2 is a top plan view of the invented chassis.

Specifically, the motherboard is installed parallel to and adjacent to the bottom surface of card cage 37 and the peripheral devices are installed in top portion 15 in a single layer so that the bottom surface of each drive is adjacent the inside bottom surface of the top half. As shown in FIGS. 1 and 2, for typical component sizes, four peripheral devices may be placed in top half 15, two in front and two in the rear. The two units in the front would typically be units which require that removable media be inserted such as floppy disks or CD-ROMs, while hard disk drives which do not have removable media would be installed at the back of top half 15. In this manner, floppy disks or CD-ROMs may be inserted into slots 63a or 63b provided at the front of top half 15.

Other components of the personal computer such as memory and the processor are installed on the motherboard as is typical in the art. Preferably, the processor 57 is installed near the front of the motherboard relatively close to fans 43a and 43b and there should be no obstructions (other than fan guard 47) between the fans and the top surface of the processor so as to provide maximum cooling to the processor.

FIG. 3 shows the details of motherboard and card cage sub-chassis 37 holding a full size card 39a, show in shadow, between rear slots 37 and front slots 47. Motherboard 35, shown partially broken away, is also shown installed within sub-chassis 37. Sub-chassis 37 fits inside bottom portion 13 and is held in place by thumb screws 58 (only one is shown, the other is at the opposite end which cannot be seen in FIG. 3. The thumb screws also pass through an installed motherboard to hold it in place as well. The sub-chassis is dimensioned to accept all currently commercially available motherboards. Given the rapid change of technology, the design allows easy field upgrades of the motherboard, without tools, by loosening the thumb screws, lifting the old motherboard out and inserting a new motherboard into the sub-chassis.

The chassis may also include brackets 45a and 45b having an attached resilient layer 49 which engages the tops of cards 39 installed in slots 39a in motherboard 35 when the chassis is in a closed position to hold the cards in place. Examples of cards which may be installed in such slots are modem cards, parallel printer port cards, additional memory cards and the like. A set of cables 51 provide an electrical connection between the components in the bottom half of the chassis and the components in the top half of the chassis for data, address and control signals. Power is supplied to the components in the top half of the chassis by cable 53.

Optionally, a lock 61 may be provided so that the chassis can be locked in a closed position.

By this design, i.e., placing peripheral devices such as disk drives and CD-ROM drives in the top half of the chassis and placing the remaining components of a personal computer such as its motherboard, power supply and cards in the bottom portion of the chassis, a very compact design is realized which can be easily serviced since all the components are easily reached when the chassis is in an open position.

The invented chassis also utilizes brackets 65 to hold peripheral devices such as disk drives and CD-ROM drives as best seen in FIGS. 4–7. The brackets are physically attached to the chassis by screws, blind rivets or the like and are arranged in pairs which are spaced apart so that standard-sized peripheral components can be easily installed and removed without the use of tools.

A suitable bracket for this purpose is shown in FIGS. 4–7. The brackets are made of spring stainless steel such as 0.025 inch thick spring stainless steel 3014 hard. As best seen in FIG. 4, the bracket has a bottom portion 71 which is attached to the chassis by screws or rivets through holes 73 as noted above. A side portion 77 extending from the bottom portion is angled inwards towards where the peripheral device would be mounted. A typical inward angle for this purpose is 80° to 85° as shown in FIG. 6. At the top of side portion, there is an engaging flange 81 which runs the length of the side portion so as to fit over the top surface of a peripheral device after it has been installed as shown in FIG. 5. The engaging flange forms a semicircle offset from the side portion. Preferably, the offset 83 is 0.05 inch from the side portion and the semicircular portion has a radius of 0.125 inch. The engaging flange, which extends above the top surface of the peripheral device, can be spread slightly outwardly by applying pressure which enables the peripheral device to be removed as shown in FIG. 7. For installation, the peripheral device simply is placed on to the mounting brackets and is snapped into place by hand pressure. Of course, appropriate cables must be attached and removed from the peripheral devices as appropriate.

We claim:

1. A bracket for engaging a peripheral device installed in a computer housing comprising:

a) a bottom portion for coupling to said computer housing;

b) a side portion coupled at one end to said bottom portion and extending therefrom at an acute angle;

c) an engaging flange disposed at a second end of said side portion wherein at least one of said engaging flange engages said peripheral device; and wherein d) said engaging flange has an arcuate shape.

2. The bracket defined by claim 1 wherein said bracket is comprised of spring stainless steel.

3. The bracket defined by claim 1 wherein said bracket wherein the acute angle is 80° to 85°.

4. The bracket defined by claim 1 wherein said engaging flange runs the length of the side portion so as to fit over the top surface of the peripheral device after it has been installed.

5. The bracket defined by claim 1 wherein said engaging flange forms a semicircle offset from the side portion.

* * * * *

UNITED STATES PATENT AND TRADEMARK OFFICE
CERTIFICATE OF CORRECTION

PATENT NO. : 5,890,693
DATED : April 6, 1999
INVENTOR(S) : Do et al.

It is certified that error appears in the above-identified patent and that said Letters Patent is hereby corrected as shown below:

In column 2, at line 20, please delete "installed in t chassis" and insert -- installed in the chassis --.

In column 2, at line 28, please delete "in FIG. 4 an installed peripheral device" and insert -- in FIG. 4 with an installed peripheral device --.

In column 4, claim 1, paragraph (c), at line 49, delete "wherein at least one of said engaging flange" and insert -- wherein at least one of said side portion and said engaging flange --.

Signed and Sealed this

Twenty-seventh Day of February, 2001

NICHOLAS P. GODICI

*Attest:*

*Attesting Officer*   Acting Director of the United States Patent and Trademark Office